(12) United States Patent
Kubota

(10) Patent No.: US 7,283,322 B2
(45) Date of Patent: Oct. 16, 2007

(54) DEVICE TO PREVENT CARTRIDGE INCORRECT INSERTION, A CARTRIDGE AUTO-CHANGER, AND A CARTRIDGE AUTOMATIC CONTROL DEVICE WITH AN AUTO-CHANGER

(75) Inventor: Hiromu Kubota, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 302 days.

(21) Appl. No.: 10/798,774

(22) Filed: Mar. 11, 2004

(65) Prior Publication Data

US 2005/0080993 A1    Apr. 14, 2005

(30) Foreign Application Priority Data

Oct. 9, 2003    (JP)    ............................ 2003-351239

(51) Int. Cl.
*G11B 15/00*    (2006.01)
(52) U.S. Cl. ................................... 360/96.5
(58) Field of Classification Search ............... 360/1, 360/71, 83, 91, 92, 94, 96.5, 96.6; 369/178.01, 369/77.21; 720/730, 731
See application file for complete search history.

(56) References Cited

U.S. PATENT DOCUMENTS

| | | | | |
|---|---|---|---|---|
| 4,853,916 A | * | 8/1989 | Tomita | ..................... 369/30.43 |
| 5,196,978 A | | 3/1993 | Washo et al. | |
| 5,402,283 A | * | 3/1995 | Yamakawa et al. | ........... 360/92 |
| 5,537,377 A | * | 7/1996 | Takai et al. | ................. 720/632 |
| 5,577,014 A | | 11/1996 | Kawamura | |
| 5,959,803 A | * | 9/1999 | Okamoto et al. | ............. 360/92 |
| 5,979,755 A | * | 11/1999 | Chaya | ......................... 235/383 |
| 6,084,736 A | | 7/2000 | Kurokawa et al. | |
| 6,392,987 B1 | * | 5/2002 | Goto et al. | ................. 720/730 |
| 6,512,653 B1 | * | 1/2003 | Sasaki et al. | ................. 360/92 |

FOREIGN PATENT DOCUMENTS

| | | |
|---|---|---|
| JP | 01-146158 A | 6/1989 |
| JP | 10-188538 A | 7/1998 |

\* cited by examiner

*Primary Examiner*—Anh T. N. Vo
(74) *Attorney, Agent, or Firm*—Pearne & Gordon LLP

(57) ABSTRACT

The device to prevent cartridge incorrect insertion according to the present invention has a management information reading part wherein in the case where an information recording cartridge having a housing of substantially rectangular flat shape with a predetermined thickness that includes a notch for preventing incorrect insertion provided at one corner on right or left side in the foreside of the housing, a recording medium stored within the housing, a memory module that records management information therein, and an antenna for radio communication of the memory module disposed at a predetermined position with a displacement in the right or left direction in the rearward of the housing is inserted from its backside into a cartridge storage part, the management information reading part is disposed at the position so that it can perform radio communication with the memory module on a path through which an antenna for radio communication of the memory module passes, and a determining part that determines whether or not the direction of inserting the information recording cartridge is correct based on whether or not the management information reading part reads management information of the recording medium and outputs a determination result.

15 Claims, 7 Drawing Sheets

3 ...... TAPE CARTRIDGE
3c ...... REEL DRIVE HOLE (RECESSED PART)
12 ...... TAPE CARTRIDGE HOLDER
14 ...... STOPPER PIECE
14a ...... CLAW
14b ...... TAPE CARTRIDGE STOPPER
14c ...... JOINT PART
15 ...... SWITCH

F I G. 7
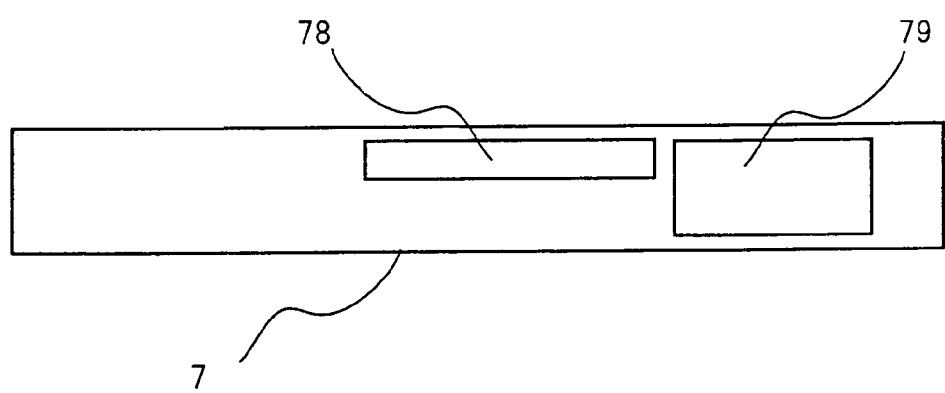

(a) NORMAL INSERTION (b) INCORRECT INSERTION

DEVICE TO PREVENT CARTRIDGE INCORRECT INSERTION, A CARTRIDGE AUTO-CHANGER, AND A CARTRIDGE AUTOMATIC CONTROL DEVICE WITH AN AUTO-CHANGER

BACKGROUND OF THE INVENTION

The present invention relates to a device to prevent cartridge incorrect insertion, a cartridge auto-changer and a cartridge automatic control device with an auto-changer with respect to an information recording cartridge.

A cartridge control device has a device to prevent cartridge incorrect insertion that prevents an information recording cartridge from being inserted from the incorrect direction into a cartridge storage part of the cartridge control device. A prior art device to prevent cartridge incorrect insertion is disclosed in Unexamined Patent Publication No. Hei 01-146158. The prior art device to prevent cartridge incorrect insertion installed in a cartridge control device will be described below.

The prior art device to prevent cartridge incorrect insertion prevents incorrect insertion of the information recording cartridge by disposing a notch for preventing incorrect insertion at a predetermined position on the outer shape of the information recording cartridge. The cartridge storage part of the cartridge control device has a projection as the device to prevent cartridge incorrect insertion disposed at the position where the notch for preventing incorrect insertion falls in the case where the information recording cartridge is inserted from the correct direction. While the projection of the cartridge storage part does not interfere with the information recording cartridge physically in the case where the information recording cartridge is inserted from the correct direction, it interferes with the information recording cartridge physically in the case where the information recording cartridge is inserted from the incorrect direction (That is, the information recording cartridge cannot be inserted in fact).

FIG. 9 is a figure for illustrating the function of the prior art device to prevent cartridge incorrect insertion of the cartridge control device. Parts (a) and (b) of FIG. 9 schematically show the cartridge control device 2 and the information recording cartridge 93 seen from above. The cartridge control device 2 has the projection 92 as the device to prevent cartridge incorrect insertion. The information recording cartridge 93 has the notch for preventing incorrect insertion 91 on the left side in the foreside. Part (a) of FIG. 9 shows the situation in which the information recording cartridge 93 is stored in the cartridge control device 2 at a predetermined position without being interfered by the projection 92 as the device to prevent cartridge incorrect insertion when the user inserts the information recording cartridge 93 from the correct direction (referred to as "normal direction") into the cartridge control device 2 (at normal insertion). Part (b) of FIG. 9 shows the situation in which a forward edge of the information recording cartridge 93 hits against the projection 92 as the device to prevent cartridge incorrect insertion and remain at the position so that the information recording cartridge 93 cannot enter into the cartridge control device 2 completely when the user inserts the information recording cartridge 93 from the incorrect direction into the cartridge control device 2 (at incorrect insertion).

The information recording cartridge 93 is installed in the cartridge control device 2 only when being inserted from the correct direction. In the case where the information recording cartridge 93 is inserted from the correct direction into the cartridge control device 2, the device to prevent cartridge incorrect insertion may have a switch, actuator of which is activated by the housing of the information recording cartridge 93. Based on activation of the switch, the device to prevent cartridge incorrect insertion determines that the information recording cartridge 93 has been inserted from the correct direction.

The above-mentioned prior art device to prevent cartridge incorrect insertion is used for the cartridge control device and also a cartridge auto-changer that stores a plurality of information recording cartridges 93 inserted from the direction shown in part (a) of FIG. 9 in a magazine and loads the information recording cartridge 93 one by one in the cartridge control device 2 located in the rearward position (upper position of part (a) of FIG. 9).

The above-mentioned prior art device to prevent cartridge incorrect insertion adopts the notch for preventing incorrect insertion disposed in the foreside of the information recording cartridge. It is possible to attach the prior art device to prevent cartridge incorrect insertion to the cartridge storage part of a type into which the information recording cartridge is inserted from its foreside. However, the prior art device to prevent cartridge incorrect insertion cannot apply to the cartridge storage part of a type into which the information recording cartridge is inserted from any side other than its foreside (no notch for preventing incorrect insertion is disposed at a predetermined position in the foreside of the information recording cartridge).

Further, in a tape library device (cartridge automatic control device) having a cartridge control device and a rotary cartridge auto-changer as shown in FIG. 1, when inserting the information recording cartridge into the tape library device, the information recording cartridge needs to be inserted from the opposite direction to the normal direction, so that the prior art device to prevent cartridge incorrect insertion cannot be applied. By storing the information recording cartridge in the plurality of cartridge storage parts and moving them while being rotated, the tape library device in FIG. 1 can perform the flexible control of arbitrarily selecting the information recording cartridge loaded in the auto-changer and reading out information stored therein. The cartridge storage part into which the information recording cartridge is inserted from the opposite direction is rotated and moved to the position opposed to the cartridge inserting port of the cartridge control device to eject the inserted information recording cartridge to the opposite direction, thereby to load the information recording cartridge in the cartridge control device from the normal direction.

Recently, the information recording cartridge having a memory module such as MIC (Memory In Cassette) and CM (Cassette Memory) and the cartridge control device for recording and/or reproducing information to/from the information recording cartridge have become widespread on the market. The information recording cartridge having a memory module such as MIC and CM built-in comprises a housing of substantially rectangular flat shape with a predetermined thickness that has a notch for preventing incorrect insertion at its left corner in the foreside, a recording medium stored in the housing, a memory module that records management information therein, and an antenna for radio communication of the memory module disposed at a predetermined position with a displacement in the right or left direction in the backside of the housing.

In a device into which the information recording cartridge is inserted from any direction other than the normal direction (for example, from its backside), the present invention intends to provide a device to prevent cartridge incorrect insertion capable of preventing or detecting incorrect insertion, a reliable cartridge auto-changer and a cartridge automatic control device with an auto-changer that load the device to prevent cartridge incorrect insertion therein.

In a device into which the information recording cartridge having a memory module such as MIC or CM built-in is inserted from any direction other than the normal direction (for example, from its backside), the present invention intends to provide a reliable device to prevent cartridge incorrect insertion capable of determining whether or not the cartridge inserting direction is correct and outputting the determination information, a reliable cartridge auto-changer and a cartridge automatic control device with an auto-changer that load the device to prevent cartridge incorrect insertion therein.

In addition, in specification, claims and abstract, the right-and-left direction of the information recording cartridge refers to the direction when the information recording cartridge is seen from above with its foreside up and its backside down.

BRIEF SUMMARY OF THE INVENTION

To solve the above-mentioned problems, the present invention has the following configuration. A device to prevent cartridge incorrect insertion from one aspect of the present invention comprises a claw that allows an information recording cartridge to be inserted into and taken out of a cartridge storage space, the above-mentioned information recording cartridge having a housing of substantially rectangular flat shape with a predetermined thickness in which a recessed part or a through hole disposed at the position other than the central position and a recording medium stored within the above-mentioned housing, protrudes into the above-mentioned cartridge storage space so as to go in and out freely and enters into the above-mentioned recessed part or through hole of the above-mentioned information recording cartridge only in the case where the above-mentioned information recording cartridge is inserted from a predetermined direction into the above-mentioned cartridge storage space; and a stopper working with the above-mentioned claw that does not protrude into the above-mentioned cartridge storage space and allows the above-mentioned information recording cartridge to be inserted and stored in the above-mentioned cartridge storage space when the above-mentioned claw enters into the above-mentioned recessed part or through hole, and protrudes into the above-mentioned cartridge storage space and prevents the above-mentioned information recording cartridge from being inserted and stored in the above-mentioned cartridge storage space when the above-mentioned claw does not enter into the above-mentioned recessed part or through hole.

With such configuration, when the information recording cartridge is inserted from the correct direction, the claw enters into the recessed part or through hole of the information recording cartridge and the stopper working with the claw is positioned so as not to prevent the information recording cartridge from being stored. The user can insert the information recording cartridge up to the back of the cartridge storage part (having the cartridge storage space).

On the other hand, when the information recording cartridge is inserted from the incorrect direction (at incorrect insertion), the claw does not enter into the recessed part or through hole of the information recording cartridge. The stopper working with the claw is positioned so as to prevent the information recording cartridge from being inserted. The user cannot insert the information recording cartridge into the cartridge storage part completely. Therefore, incorrect insertion of the information recording cartridge can be surely prevented. Further, since various recessed parts or through holes such as a recessed part or through hole for inserting a reel base for driving a magnetic tape reel of the information recording cartridge and a recessed part or through hole for inserting a spindle motor for driving a disk rotationally are applicable as the recessed part or through hole into which the claw enters, the present invention can apply to an information recording cartridge without specific notch for preventing incorrect insertion.

A device to prevent cartridge incorrect insertion from another aspect of the present invention comprises a claw that allows an information recording cartridge to be inserted into and taken out of a cartridge storage space, the above-mentioned information recording cartridge having a housing of substantially rectangular flat shape with a predetermined thickness in which a recessed part or a through hole disposed at the position other than the central position and a recording medium stored within the above-mentioned housing, protrudes into the above-mentioned cartridge storage space so as to go in and out freely and enters into the above-mentioned recessed part or through hole of the above-mentioned information recording cartridge only in the case where the above-mentioned information recording cartridge is inserted from a predetermined direction into the above-mentioned cartridge-storage space; a claw position detecting part that detects whether or not the above-mentioned claw enters into the above-mentioned recessed part or through hole and outputs a detection result; and a determining part that determines whether or not the direction of inserting the above-mentioned information recording cartridge is correct based on the above-mentioned detection result of the above-mentioned claw position detecting part and outputs a determination result.

With such configuration, when the information recording cartridge is inserted from the incorrect direction (at incorrect insertion), the claw does not enter into the recessed part or through hole and the claw position detecting part detects that the claw has not entered into the recessed part or through hole. Based on the detection result of the claw position detecting part, the determining part informs the user that the information recording cartridge has been inserted from the incorrect direction and/or ejects the information recording cartridge from the cartridge storage space. In this way, a highly reliable device to prevent cartridge incorrect insertion that outputs the determination information can be realized.

In a device to prevent cartridge incorrect insertion from another aspect of the present invention, the above-mentioned claw and the above-mentioned stopper are jointed with a joint part that can rock on a predetermined shaft as a fulcrum. With such simple and low-cost configuration, incorrect insertion of the information recording cartridge can be prevented by use of the recessed part or through hole at any position in the information recording cartridge.

The above-mentioned device to prevent cartridge incorrect insertion from another aspect of the present invention comprises a plurality of the above-mentioned claws and/or the above-mentioned stoppers.

With the configuration in which the claw enters into the recessed part or through hole at plural positions, incorrect insertion of the information recording cartridge can be detected more reliably. The stoppers protrude into the cartridge storage space at plural positions, thereby to prevent incorrect insertion of the information recording cartridge more reliably.

In the above-mentioned device to prevent cartridge incorrect insertion from another aspect of the present invention, the above-mentioned information recording cartridge stores a magnetic tape reel therein and the above-mentioned recessed part or through hole is a recessed part or through hole for inserting a reel base of a cartridge control device that engages with the above-mentioned magnetic tape reel thereinto.

For example, in the cartridge auto-changer into which the information recording cartridge is inserted from its backside, it is difficult to prevent or detect incorrect insertion of the information recording cartridge by use of a notch provided in the foreside of the information recording cartridge. Since the cartridge auto-changer has no tape running system, a reel base does not engage with a magnetic tape reel. Accordingly, in the present invention, incorrect insertion of the information recording cartridge is detected and prevented by using the recessed part or through hole for inserting the reel base thereinto.

A cartridge auto-changer from another aspect of the present invention comprises a plurality of cartridge storage parts, each of which includes the above-mentioned cartridge storage space for mounting an information recording cartridge with being inserted from its backside, the above-mentioned information recording cartridge having a housing of substantially rectangular flat shape with a predetermined thickness in which a recessed part or a through hole disposed at the position other than the central position and a recording medium stored within the above-mentioned housing; a moving mechanism that moves the above-mentioned cartridge storage part selected from the above-mentioned plurality of cartridge storage parts to a first position at which the user inserts or take out the above-mentioned information recording cartridge and moves the above-mentioned cartridge storage part selected from the above-mentioned plurality of cartridge storage parts to a second position opposed to a cartridge inserting port of a cartridge control device for recording and/or reproducing information on/from the above-mentioned recording medium; and the above-mentioned device to prevent cartridge incorrect insertion disposed at least one position of the above-mentioned first position, the above-mentioned second position and inside of each cartridge storage part, wherein the above-mentioned claw enters into the above-mentioned recessed part or through hole of the above-mentioned information recording cartridge only in the case where the above-mentioned information recording cartridge is inserted from its backside into the above-mentioned cartridge storage space.

With such configuration, in the rotary cartridge auto-changer into which the information recording cartridge is inserted from its backside, incorrect insertion can be prevented by using the above-mentioned device to prevent cartridge incorrect insertion.

For example, incorrect insertion of the information recording cartridge can be detected-and prevented by using the recessed part or through hole for inserting a reel base that drives a magnetic tape rotationally or the recessed part or through hole for inserting a spindle motor that drives a disk rotationally.

A cartridge automatic control device with an auto-changer from another aspect of the present invention comprises the above-mentioned cartridge auto-changer; and a cartridge control device having a second cartridge storage part for mounting the above-mentioned information recording cartridge with being inserted from its foreside thereinto, a second device to prevent cartridge incorrect insertion for detecting that the above-mentioned information recording cartridge has inserted from the incorrect direction or for preventing the above-mentioned information recording cartridge from being inserted from the incorrect direction by use of a notch for preventing incorrect insertion provided at one corner on right or left side in the foreside of the above-mentioned -housing of the above-mentioned information recording cartridge, and a control part for recording and/or reproducing information on/from the above-mentioned recording medium.

With such configuration, in the cartridge automatic control device having the rotary cartridge auto-changer into which the information recording cartridge is inserted from its backside and the cartridge control device into which the information recording cartridge is inserted from its foreside, incorrect insertion of the information recording cartridge can be prevented.

A device to prevent cartridge incorrect insertion from another aspect of the present invention comprises a management information reading part wherein, in the case where an information recording cartridge having a housing of substantially rectangular flat shape with a predetermined thickness that includes a notch for preventing incorrect insertion provided at one corner on right or left side in the foreside of the above-mentioned housing, a recording medium stored within the above-mentioned housing, a memory module that records management information therein, and an antenna for radio communication of the above-mentioned memory module disposed at a predetermined position with a displacement in the right or left direction in the rearward of the above-mentioned housing is inserted from its backside into a cartridge storage part, a management information reading part is disposed at the position so that it can perform radio communication with the above-mentioned memory module on a path through which the above-mentioned antenna for radio communication of the above-mentioned memory module passes or in the state in which the above-mentioned information recording cartridge is stored from its backside in the above-mentioned cartridge storage part; and a determining part that determines whether the direction of inserting the above-mentioned information recording cartridge is correct or not based on whether or not the above-mentioned management information reading part reads management information of the above-mentioned recording medium and outputs a determination result.

With such configuration, in the mechanism into which the information recording cartridge having the memory module such as MIC and CM built-in is inserted from its backside, the highly reliable device to prevent cartridge incorrect insertion that determines whether or not the direction of inserting the information recording cartridge is correct and outputs a determination information can be realized. Further, by using the existing management information reading device that reads management information from the memory module of the information recording cartridge, a low-cost device to prevent cartridge incorrect insertion that requires neither special part nor mechanism for preventing incorrect insertion can be realized.

A cartridge auto-changer from another aspect of the present invention comprises a plurality of cartridge storage parts for mounting an information recording cartridge with being inserted from its backside thereinto, the above-mentioned information recording cartridge having a housing of substantially rectangular flat shape with a predetermined thickness that includes a notch for preventing incorrect insertion provided at one corner on right or left side in the foreside of the above-mentioned housing, a recording medium stored within the above-mentioned housing, a memory module that records management information therein, and an antenna for radio communication of the above-mentioned memory module disposed at a predetermined position with a displacement in the right or left direction in the rearward of the above-mentioned housing; a moving mechanism that moves the above-mentioned cartridge storage part selected from the above-mentioned plurality of cartridge storage parts to a first position at which the user inserts or take out the above-mentioned information recording cartridge and moves the above-mentioned cartridge storage part selected from the above-mentioned plurality of cartridge storage parts to a second position opposed to a cartridge inserting port of a cartridge control device for recording and/or reproducing information on/from the above-mentioned recording medium; and the above-mentioned device to prevent cartridge incorrect insertion disposed at least one position of the above-mentioned first position, the above-mentioned second position and inside of each cartridge storage part.

With such configuration, in the rotary cartridge auto-changer into which the information recording cartridge is inserted from its backside, incorrect insertion of the information recording cartridge can be prevented easily by using the above-mentioned device to prevent cartridge incorrect insertion.

A cartridge automatic control device with an auto-changer from another aspect of the present invention comprises the above-mentioned cartridge auto-changer; and a cartridge control device having a second cartridge storage part for mounting the above-mentioned information recording cartridge with being inserted from its foreside thereinto, a second device to prevent cartridge incorrect insertion for determining whether or not the above-mentioned information recording cartridge has been inserted from the correct direction or for preventing the above-mentioned information recording cartridge from being inserted from the incorrect direction by use of a notch for preventing incorrect insertion, and a control part for recording and/or reproducing information on/from the above-mentioned recording medium.

With such configuration, in the rotary cartridge auto-changer into which the information recording cartridge is inserted from its backside, incorrect insertion of the information recording cartridge can be prevented easily by using the above-mentioned device to prevent cartridge incorrect insertion.

A cartridge automatic control device with an auto-changer from another aspect of the present invention further comprises a lid that is closed automatically in the state in which the above-mentioned information recording cartridge is stored in a cartridge inserting port, and in the case where the above-mentioned determining part determines that the direction of inserting the above-mentioned information recording cartridge is incorrect, the above-mentioned cartridge automatic control device with an auto-changer does not close the above-mentioned lid.

With such configuration, by controlling the operation of closing the lid at incorrect insertion of the information recording cartridge, the user is easy to detect incorrect insertion of the information recording cartridge and the cartridge automatic control device with an auto-changer with high functionality and safety can be realized.

A cartridge automatic control device with an auto-changer from another aspect of the present invention further comprises a display part, and in the case where the above-mentioned determining part determines that the direction of inserting the above-mentioned information recording cartridge is incorrect, the above-mentioned display part displays that the direction of inserting the above-mentioned information recording cartridge is incorrect.

With such configuration, by informing the user of incorrect insertion of the information recording cartridge by use of the display part at incorrect insertion of the information recording cartridge, the user is easy to detect incorrect insertion of the information recording cartridge and the cartridge automatic control device with an auto-changer with higher functionality and safety can be realized.

The novel features of the invention are set forth with particularity in the appended claims. The invention as to both structure and content, and other objects and features thereof will best be understood from the detailed description when considered in connection with the accompanying drawings.

BRIEF DESCRIPTION OF THE DRAWINGS

FIG. 7 is a view showing the configuration of a front panel of a tape library device in a second embodiment according to the present invention;

Part or All of the drawings are drawn schematically for diagrammatic representation and it should be considered that they do not necessarily reflect relative size and position of components shown therein.

DETAILED DESCRIPTION OF THE INVENTION

Embodiments that specifically describe best modes for conducting the present invention will be described referring to figures below.

FIRST EMBODIMENT

Referring to FIG. 1 to FIG. 5, a device to prevent cartridge incorrect insertion, a cartridge auto-changer and a cartridge automatic control device with an auto-changer in a first embodiment according to the present invention will be described.

Figure 1:
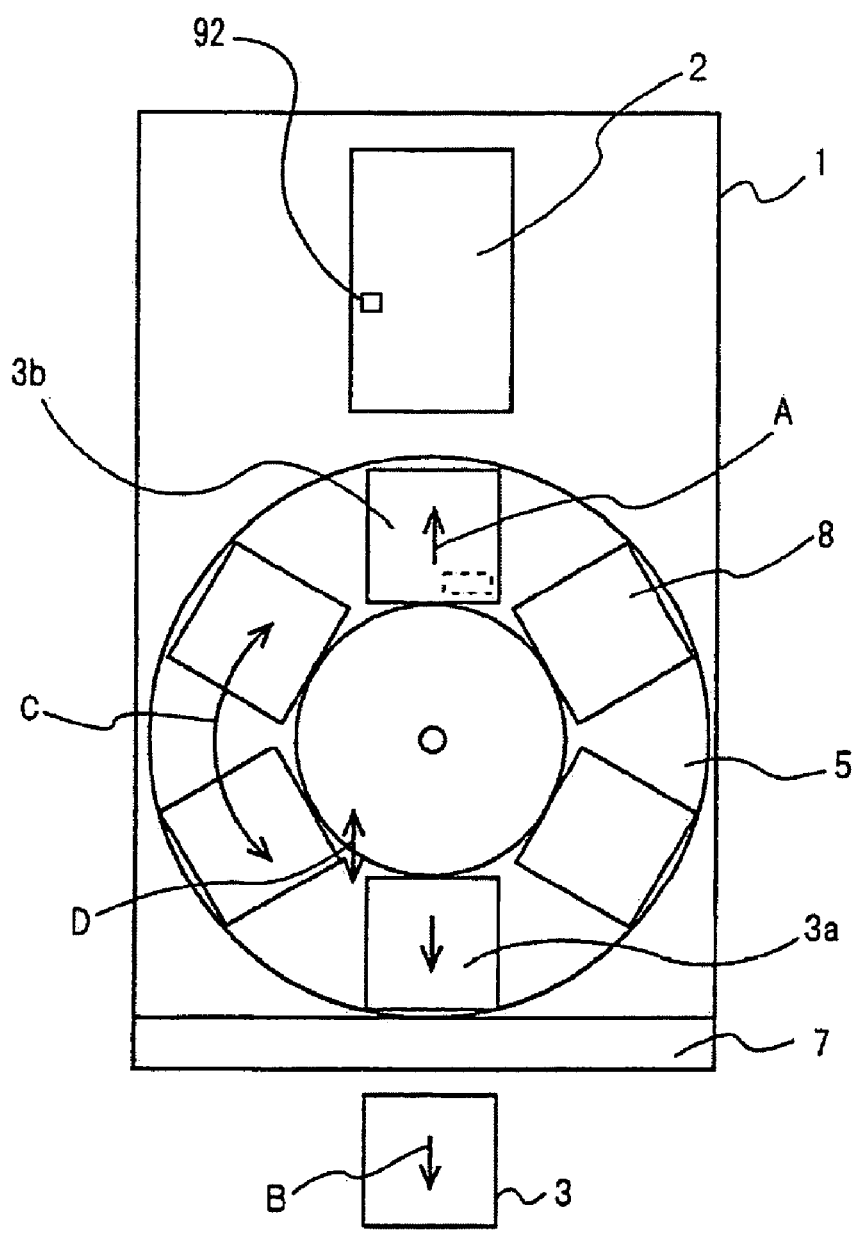
FIG. 1 is a schematic view of the configuration of a cartridge automatic control device with an auto-changer in a first embodiment according to the present invention.

FIG. 1 is a schematic plan view of the configuration of the cartridge automatic control device with an auto-changer (tape library device) in the first embodiment according to the present invention. Referring to FIG. 1, the configuration of the tape library device will be described below.

In FIG. 1, numeral reference 1 designates the tape library device (cartridge automatic control device with an auto-changer). The tape library device 1 has a cartridge control device 2 for recording and/or reproducing to/from an information recording cartridge 3 and a cartridge auto-changer. The information recording cartridge 3 has a housing of substantially rectangular flat shape with a predetermined thickness in which a reel drive hole (recessed part) 3c (a through hole may be adopted) opened to one side is disposed at the position other than the central position and a recording medium stored within the housing (a magnetic tape wound around a reel in the first embodiment).

The cartridge auto-changer has a turntable (transferring mechanism) 5 that mounts a plurality of cartridge storage parts 8 (6 units in the first-embodiment) thereon and a front panel 7. The tape library device 1 arbitrarily selects one information recording cartridge 3 loaded in the cartridge auto-changer according to a program set by the user, installs the information recording cartridge 3 into the cartridge control device 2, reads out information recorded on the recording medium and outputs the information. The tape library device 1 can also arbitrarily select one information recording cartridge 3 loaded in the cartridge auto-changer according to a program set by the user, install the information recording cartridge 3 into the cartridge control device 2, and record information inputted from outside on the recording medium.

A letter "A" indicates the direction in which the information recording cartridge 3 is loaded into the cartridge control device 2 correctly (hereinafter referred to as "normal direction"), a letter "B" indicates the direction in which the information recording cartridge 3 is taken out from the tape library device 1 and a letter "C" indicates the direction of rotating the turntable 5. The direction shown by leading edge of the arrows A and B shows the foreside of the information recording cartridge 3.

The cartridge storage part 8 stores the installed information recording cartridge 3 at a position 3a (referred to as a "first position") and at a position 3b (referred to as a "second position"). Therefore, the device to prevent cartridge incorrect insertion is provided at the first position 3a and the second position 3b. The device to prevent cartridge incorrect insertion may be provided only at the first position 3a. By rotating the turntable 5 in the direction C, the cartridge storage part 8 (the information recording cartridge 3) is moved from the first position 3a to the second position 3b and moved from the second position 3b to the first position 3a. The turntable 5 has an ejecting mechanism for ejecting the information recording cartridge 3 at the first position 3a and the second position 3b.

In FIG. 1, the information recording cartridges 3 is inserted at the first position 3a of the tape library device 1. The turntable 5 rotates the information recording cartridge 3 installed in the cartridge storage part 8 at the first position 3a to move it to the second position 3b. At the second position 3b, the turntable 5 ejects the information recording cartridge 3 and installs the information recording cartridge 3 in the cartridge control device 2. To insert the information recording cartridge 3 from its foreside in the normal direction A at the second position 3b, the information recording cartridge 3 must be inserted from its backside in the direction B at the first position 3a.

Figure 9:
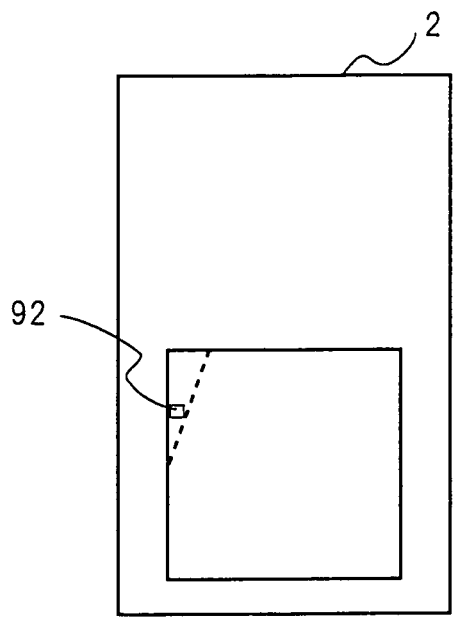
FIG. 9 is a view of illustrating the function of a prior art device to prevent cartridge incorrect insertion of a cartridge control device.
Figure 9:
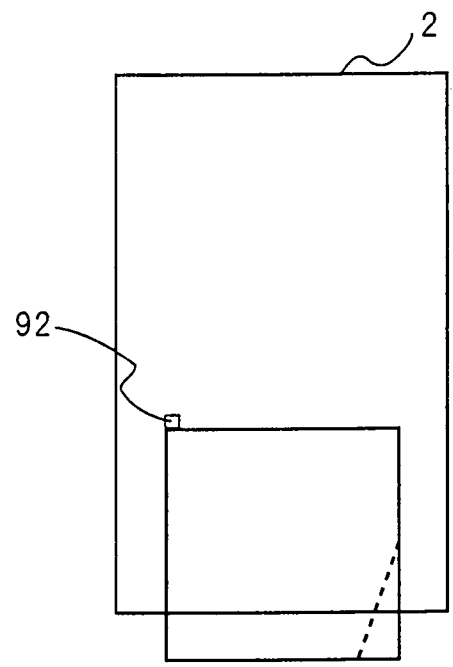
Figure 9:
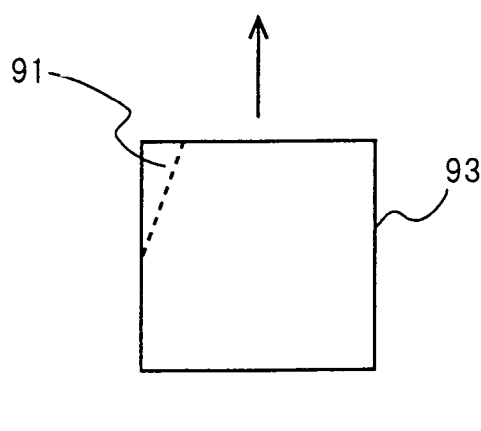
Figure 9:
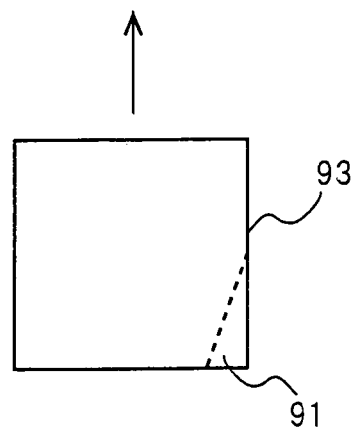

The cartridge control device 2 has a second cartridge storage part for mounting the information recording cartridge 3 with being inserted from its foreside, a second device to prevent cartridge incorrect insertion 92 (the prior art device to prevent cartridge incorrect insertion shown in FIG. 9) for determining whether the information recording cartridge 3 has been inserted from the correct direction by means of a notch for preventing incorrect insertion and a control part for recording and/or reproducing information on/from the recording medium. The cartridge control device 2 ejects the information recording cartridge 3 that has completed reproduction (or recording) and stores the information recording cartridge 3 in the cartridge storage part 8 located at the second position 3b.

The tape library device 1 can eject the unnecessary information recording cartridge 3 loaded in the cartridge auto-changer from the first position 3a.

Next, referring to FIG. 2 to FIG. 5, the configuration of the device to prevent cartridge incorrect insertion provided at the position 3a will be described. The device to prevent cartridge incorrect insertion provided at the position 3b has the same configuration. FIG. 2 to FIG. 5 are cross-sectional drawings (from the left view) taken along-the vertical central line of the cartridge storage part 8 and the device to prevent cartridge incorrect insertion at the position 3a in FIG. 1 (plan view). The right side in FIG. 2 to FIG. 5 corresponds to the bottom side in FIG. 1.

Figure 2:
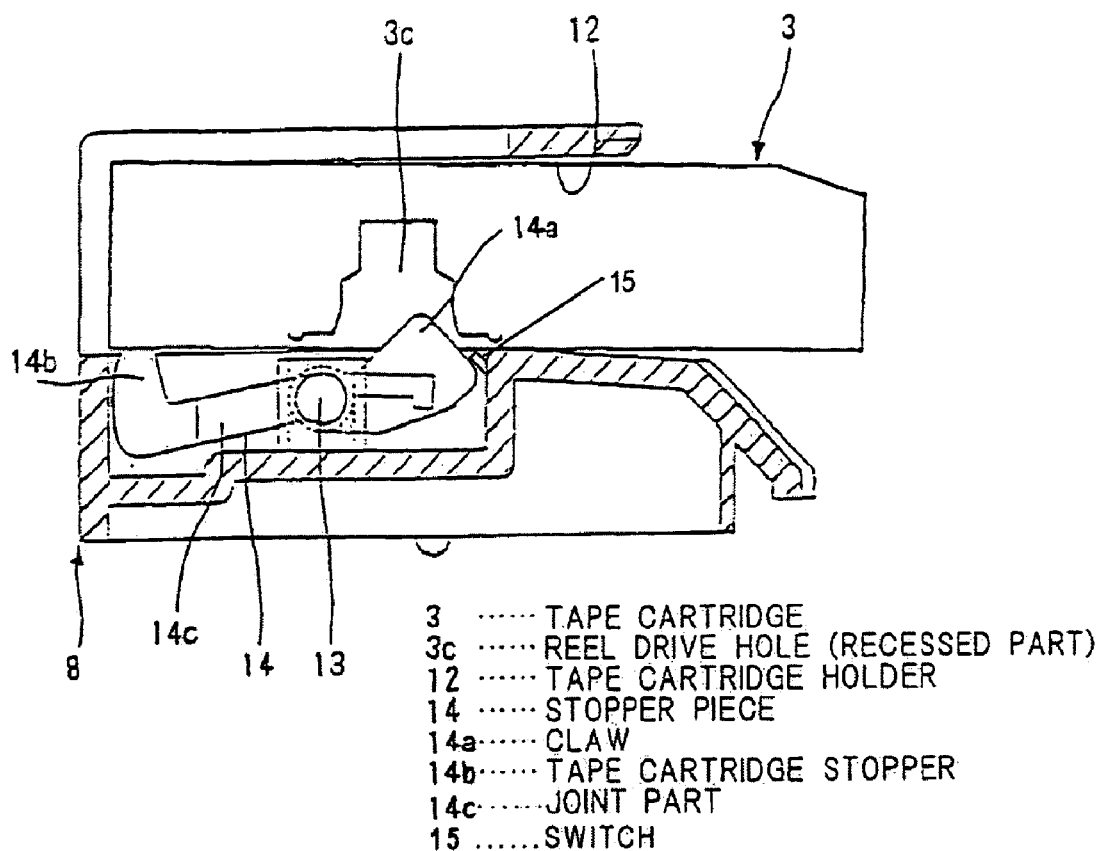
FIG. 2 is a cross-sectional view of a device to prevent cartridge incorrect insertion in the first embodiment according to the present invention when an information recording cartridge is inserted from the correct direction.
Figure 3:
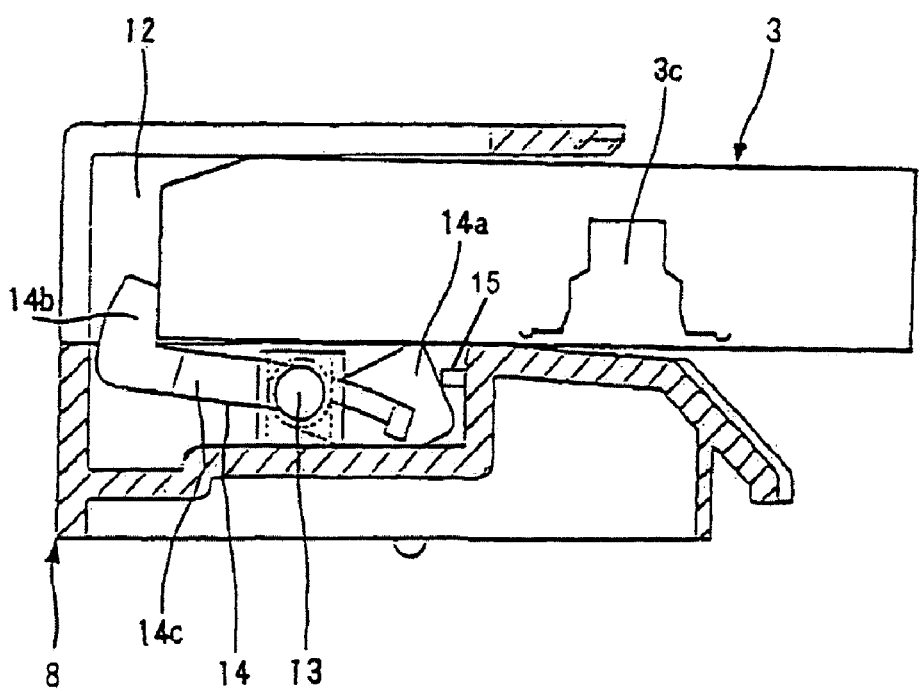
FIG. 3 is a cross-sectional view of the device to prevent cartridge incorrect insertion in the first embodiment according to the present invention when the information recording cartridge is inserted incorrectly.
Figure 4:
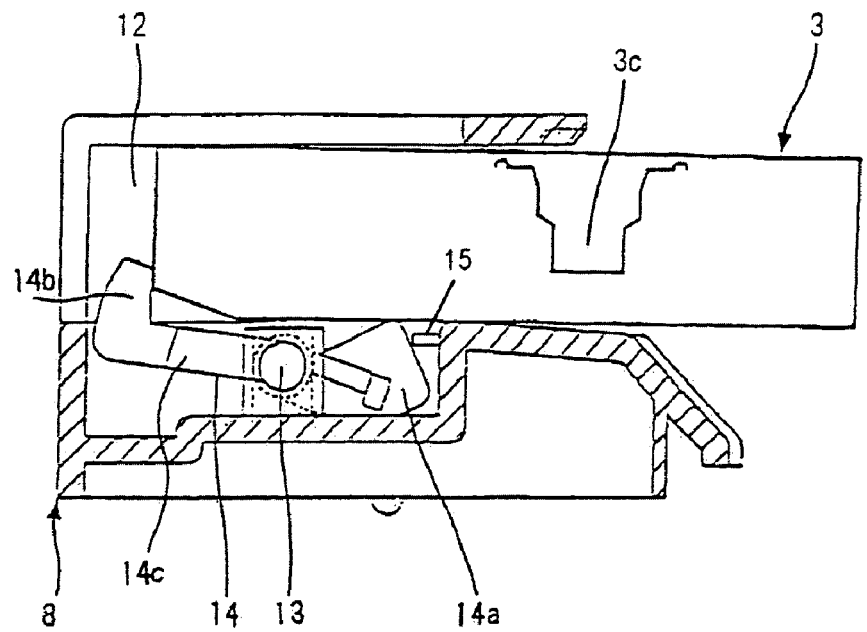
FIG. 4 is another cross-sectional view of the device to prevent cartridge incorrect insertion in the first embodiment according to the present invention when the information recording cartridge is inserted incorrectly.
Figure 5:
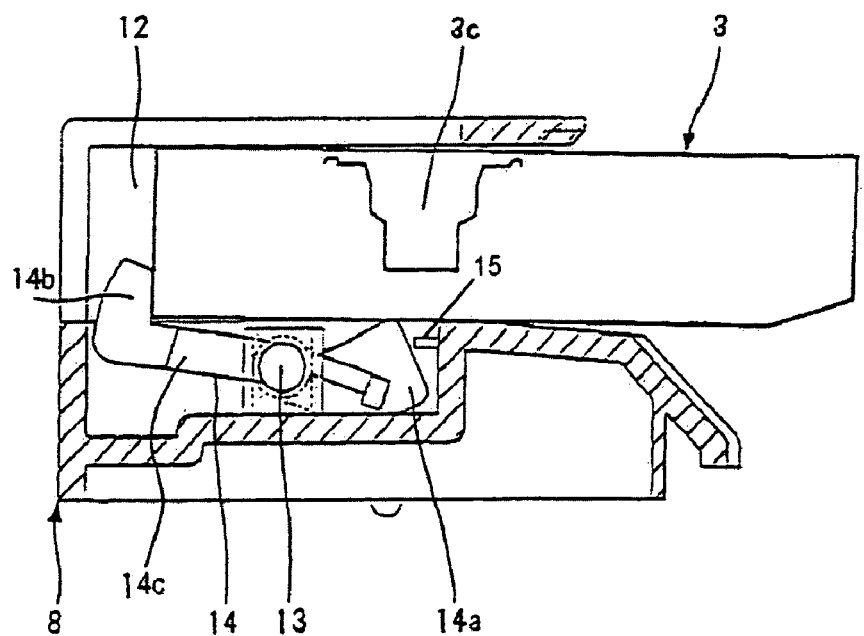
FIG. 5 is another cross-sectional view of the device to prevent cartridge incorrect insertion in the first embodiment according to the present invention when the information recording cartridge is inserted incorrectly.

FIG. 2 is a cross-sectional drawing showing the state in which the information recording cartridge 3 is inserted from the correct direction (from the backside of the information recording cartridge 3 in the first embodiment) into the cartridge storage part 8 at the position 3a in the device to prevent cartridge incorrect insertion according to the present invention (normal insertion state). FIG. 3 to FIG. 5 are a cross-sectional drawings showing the state in which the information recording cartridge 3 is inserted from the incorrect direction (from any part other than the backside of the information recording cartridge 3) into the cartridge storage part 8 at the position 3a in the device to prevent cartridge incorrect insertion according to the present invention (incorrect insertion state).

FIG. 2 to FIG. 5 show the information recording cartridge 3, the cartridge storage part 8, a stopper piece 14 and a shaft 13 as a fulcrum on which the stopper piece 14 rocks.

The cartridge storage part 8 forms a cartridge storage space 12, foreside of which (right side in FIG. 2 to FIG. 5) is opened.

The shaft 13 extends in the horizontal (lateral) direction in FIG. 1. The stopper piece 14 has a joint part 14c, a claw 14a provided at the right end of the joint part 14c and a stopper 14b provided at the left end of the joint part 14c, and can freely rock on the shaft 13 as a fulcrum in the vertical direction (seesaw movement). The stopper piece 14 is urged counterclockwise around the shaft 13 by a spring (not shown) attached to the shaft 13.

The claw 14a allows the information recording cartridge 3 to be inserted into and taken out of the cartridge storage space 12 and is urged by the spring to protrude so as to go in and out of the cartridge storage space 12 freely. The claw 14a enters into the reel drive hole 3c of the information recording cartridge 3 only when the information recording cartridge 3 is inserted from the predetermined direction (from the backside of the information recording cartridge 3 in the first embodiment) into the cartridge storage space 12.

The stopper 14b works with the claw 14a and does not protrude into the cartridge storage space 12 in the case where the claw 14a enters into the reel drive hole 3c, thereby to allow the information recording cartridge 3 to be inserted and stored in the cartridge storage space 12. In the case where the claw 14a does not enter into the reel drive hole 3c, the stopper 14 protrudes into the cartridge storage space 12, thereby to prevent the information recording cartridge 3 from being inserted and stored in the cartridge storage space 12.

The claw 14a and the stopper 14b are configured so as to go in and out of the cartridge storage space 12 in the opposite direction with each other by rocking of the stopper piece 14. When the information recording cartridge 3 is not inserted, that is, the cartridge storage space 12 is empty, and when the claw 14a enters into the reel drive hole 3c, claw 14a of the stopper piece 14 is urged by the spring to protrude into the cartridge storage space 12. The claw 14a may be urged to rock in the upward direction by any other elastic body than the spring or the moment produced by unbalance between right and left weights of the stopper piece 14 around the shaft 13. When the information recording cartridge 3 is inserted into the cartridge storage space 12, the claw 14a is pushed out of the cartridge storage space 12 by the housing of information recording cartridge 3.

Next, the operation of the above-mentioned device to prevent cartridge; incorrect insertion will be described.

As shown in FIG. 2, in the normal insertion state, the claw 14a of the stopper piece 14 enters into the reel drive hole 3c of the information recording cartridge 3. Working with this motion, the stopper piece 14 rocks on the shaft 13 as a fulcrum so that the stopper 14b is positioned so as not to prevent the insertion of the information recording cartridge 3. Accordingly, the information recording cartridge 3 can be surely inserted up to the back (rear end) of the cartridge storage space 12 in the cartridge storage part 8.

On the other hand, in the case of incorrect insertion, that is, the state in which the fore-and-aft positioning of the information recording cartridge 3 is reversed as shown in FIG. 3 (incorrect insertion state example 1), the inside-and-outside and fore-and-aft positioning of the information recording cartridge 3 is reversed as shown in FIG. 4 (incorrect insertion state example 2) and the inside-and-outside positioning of the information recording cartridge 3 is reversed as shown in FIG. 5 (incorrect insertion state example 3), the claw 14a of the stopper piece 14 is blocked by the bottom surface of the housing of the information recording cartridge 3, thereby to be pushed out of the cartridge storage space 12. The claw 14a does not enter into the recessed part of the information recording cartridge 3. With this motion, the stopper piece 14 rocks on the shaft 13 as a fulcrum so that the stopper 14b is positioned so as to prevent the insertion of the information recording cartridge 3. Thus, the stopper 14b prevents the information recording cartridge 3 from being inserted up to the back of the cartridge storage space 12. Accordingly, the information recording cartridge 3 cannot be inserted in the cartridge storage part 8 completely. In this way, the information recording cartridge 3 can be surely prevented from being inserted into the cartridge storage part 8 incorrectly.

In the first embodiment mentioned above, the reel drive hole 3c is used as a recessed part. In stead of the reel drive hole 3c, other recessed part or a through hole on the information recording cartridge 3, or a recessed part or a through hole for inserting a rotary drive spindle motor for optical disk, which is provided on a housing that the optical disk contains therein, may be configured as a recessed part into which the claw 14a enters.

In the first embodiment, the stopper piece 14 having an integrated combination of the claw 14a and the stopper 14b is adopted. This facilitates manufacturing of the stopper piece 14 and attachment of the stopper piece 14 to the shaft 13. Moreover, this can easily realize interlocking operation between the claw 14a and the stopper 14b. The present invention can prevent incorrect insertion of the information recording cartridge 3 more reliably. However, the claw 14a and the stopper 14b may be configured to be; separately provided and work with each other.

In the first embodiment, the claw 14a and the stopper 14b that works with the claw 14a may be single or plural respectively. In the case of a plurality of these elements, incorrect insertion of the information recording cartridge 3 can be prevented more reliably by engagement and disengagement at plural positions. For example, the configuration in which two claws 14a enter into the vicinity of both ends of the reel drive hole 3c with a certain level of size respectively may be adopted.

In the first embodiment, by providing the stopper 14b at one end of the stopper 14, the information recording cartridge 3 is prevented from being inserted and stored from the incorrect direction. Alternatively, the following configuration may be adopted: a first switch 15 (claw position detecting part) that turns on/off depending on whether or not the claw 14a enters into the recessed part and a second switch that turns on/off depending on whether or not the information recording cartridge 3 has been stored at the predetermined position in the cartridge storage part 12, and based on on/off of the first switch and on/off of the second switch, a determining part determines whether or not the information recording cartridge 3 has been inserted from the correct direction in the state where the information recording cartridge 3 is stored at the predetermined position in the cartridge storage part 12. When it is determined that the information recording cartridge 3 has been inserted incorrectly, the determining part suspends the operation and informs the user of it and/or ejects the information recording cartridge from the cartridge storage part.

SECOND EMBODIMENT

Figure 6:
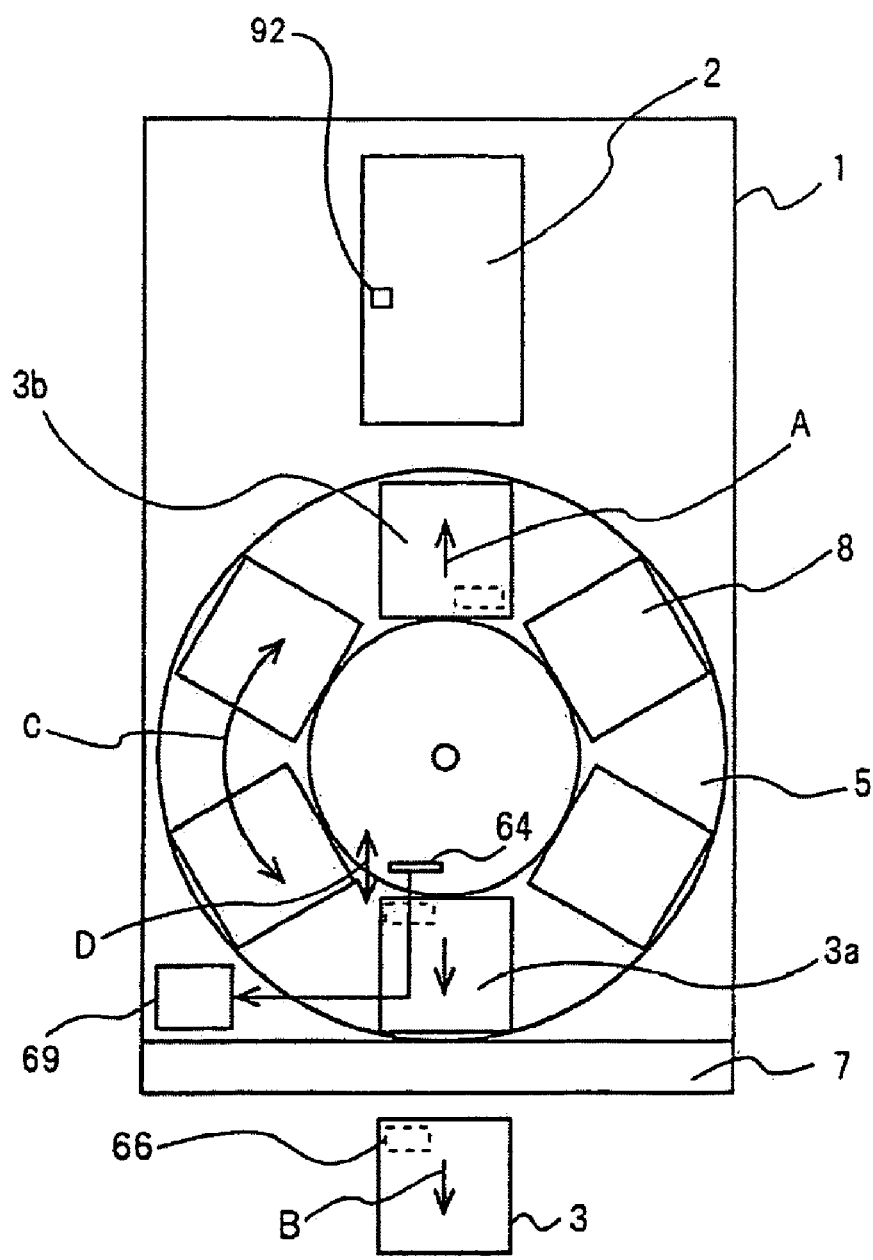
FIG. 6 is a schematic view of the configuration of a cartridge automatic control device with an auto-changer (tape library device) in a second embodiment according to the present invention.
Figure 8:
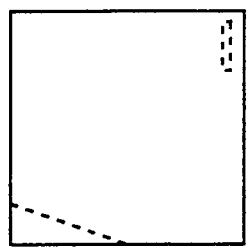
FIG. 8 is a view showing all possible directions of inserting an information recording cartridge into a cartridge auto-changer.
Figure 8:
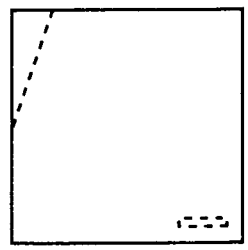
Figure 8:
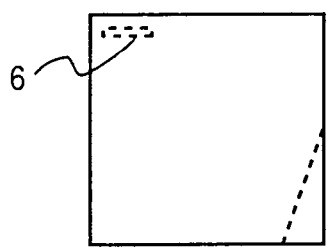
Figure 8:
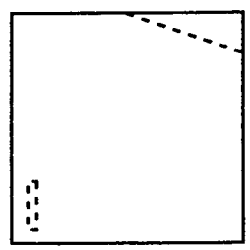
Figure 8:
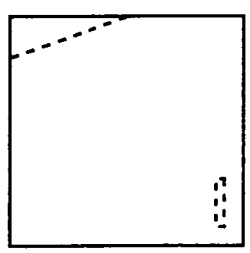
Figure 8:
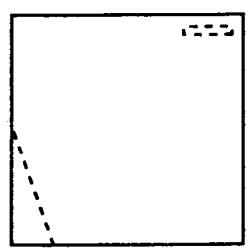
Figure 8:
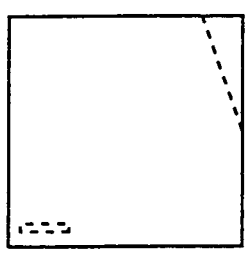
Figure 8:
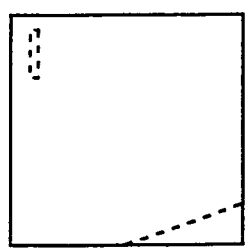

Referring to FIG. 6 to FIG. 8, a device to prevent cartridge incorrect insertion, a cartridge auto-changer and a cartridge automatic control device with an auto-changer in a second embodiment according to the present invention will be described. FIG. 6 is a schematic view of the configuration of the cartridge automatic control device with an auto-changer (tape library device) in the second embodiment according to the present invention.

The cartridge auto-changer and the cartridge automatic control device with an auto-changer of the second embodiment (FIG. 6) are different from those of the first embodiment (FIG. 1) in configuration of the device to prevent cartridge incorrect insertion disposed at the first position 3a and the second-position 3b and configuration of the cartridge control device 2. The cartridge auto-changer and the cartridge automatic control device with an auto-changer of the second embodiment are identical to those of the first embodiment in the other points.

Referring to FIG. 6, the configuration of a tape library device will be described. In FIG. 6, reference numeral 1 is the tape library device (the cartridge automatic control device with an auto-changer). The tape library device 1 has a cartridge control device 2 for recording and/or reproducing to/from an information recording cartridge 3 and a cartridge auto-changer. The cartridge auto-changer has a management information reading part 64, a turntable (moving mechanism) 5 that mounts a plurality of cartridge storage parts 8 (6 units in the second embodiment) thereon, a determining part 69 and a control panel 7. The tape library device 1 arbitrarily selects one information recording cartridge 3 loaded in the cartridge auto-changer according to a program set by the user, installs the information recording cartridge 3 into the cartridge control device 2, reads out information recorded on the recording medium and outputs the information. The tape library device 1 can also arbitrarily select one information recording cartridge 3 loaded in the cartridge auto-changer according to a program set by the user, install the information recording cartridge 3 into the cartridge control device 2, and record information inputted from outside on the recording medium.

The information recording cartridge 3 of the second embodiment contains a magnetic recording medium therein and has a memory module and antenna for radio communication 66, which is disposed at a predetermined position on the reverse of the right side in-the rearward of the top surface.

A letter "A" indicates the direction in which the information recording cartridge 3 is loaded into the cartridge control device 2 correctly (hereinafter referred to as "normal direction"), a letter "B" indicates the direction in which the information recording cartridge 3 is taken out from the tape library device 1, a letter "C" indicates the direction of rotating the turntable 5 and a letter "D" indicates the direction in which the management information reading part 64 can perform radio communication with the memory module 66 (directivity of radio communication). The direction shown by leading edges of the arrows A and B shows the foreside of the information recording cartridge 3.

The cartridge storage part 8 stores the installed information recording cartridge 3 at a position 3*a* (referred to as a "first position") and at a position 3*b* (referred to as a "second position") therein. By rotating the turntable 5 in the direction C, the cartridge storage part 8 (the information recording cartridge 3) is moved from the first position 3*a* to the second position 3*b* and moved from the second position 3*b* to the first position 3*a*. The turntable 5 has an ejecting mechanism for ejecting the information recording cartridge 3 at the first position 3*a* and the second position 3*b*.

The management information reading part 64 performs radio communication with the memory module 66 affixed at the reverse of the right side in, the rearward of the top surface of the information recording cartridge 3 and reads out the management information recorded in the memory module 66. The management information reading part 64 has a directivity D in radio communication with the memory module 66 and thus can perform radio communication only in the direction D. The management information reading part 64 is attached in the vicinity of the antenna for radio communication 66 in the state in which the information recording cartridge 3 is stored in the cartridge storage part 8 correctly. The radio field intensity of radio communication of the management information reading part 64 and the memory module 66 is weak and the directivity in communication exists. Therefore, in the case where the information recording cartridge 3 is inserted from the incorrect direction into the cartridge storage part 8, the management information reading part 64 cannot perform radio communication with the memory module 66.

As a substitute for the configuration in the second embodiment, in the case where the information recording cartridge 3 is inserted and stored from its backside in the correct direction in the cartridge storage part 8, the management information-reading part 64 may be attached in the vicinity of a path through which the antenna for radio communication of memory module 66 passes.

In the case where the management information reading part 64 can read out management information from the memory module 66, the determining part 69 determines that the information recording cartridge 3 has been inserted from its backside in the correct direction into the cartridge storage part 8, and in the case where the management information reading part 64 cannot read out management information from the memory module 66, the determining part 69 determines that the information recording cartridge 3 has not been inserted from its backside in the correct direction into the cartridge storage part 8. In the case where the information recording cartridge 3 is inserted and stored in the tape library device 1, only when the determining part 69 determines that the information recording cartridge 3 has been inserted from its backside in the correct direction into the cartridge storage part 8, the turntable 5 is allowed to rotate.

The management information reading part 64 and the determining part 69 constitute the device to prevent cartridge incorrect insertion In FIG. 6, the information recording cartridge 3 is inserted at the first position 3*a* of the tape library device 1. The turntable 5 rotates the information recording cartridge 3 installed in the cartridge storage part 8 at the first position 3*a* to move it to the second position 3*b*. At the second position 3*b*, the turntable 5 ejects the information recording cartridge 3 and installs the information recording cartridge 3 in the cartridge control device 2. To insert the information recording cartridge 3 from its foreside in the normal direction A at the second position 3*b*, the information recording cartridge 3 must be inserted from its backside in the direction B at the first position 3*a*.

The cartridge control device 2 identical to the prior device has a second cartridge storage part for mounting the information recording cartridge 3 with being inserted from its foreside, a second device to prevent cartridge incorrect insertion 92 (the prior art device to prevent cartridge incorrect insertion shown in FIG. 9) for determining whether the information recording cartridge 3 has been inserted from the correct direction by means of a notch for preventing incorrect insertion and a control part for recording and/or reproducing information on/from the recording medium.

The cartridge control device 2 ejects the information recording cartridge 3 that has completed reproduction (or recording) and stores the information recording cartridge 3 in the cartridge storage part 8 located at the second position 3*b*. The device to prevent cartridge incorrect insertion identical to that at the first position 3*a* is also provided at the second position 3*b*. When the determining part 69 determines that the information recording cartridge 3 has been inserted into the cartridge storage part 8 from its backside in the correct direction, the turntable 5 is allowed to rotate. The tape library device 1 can eject the unnecessary information recording cartridge 3 loaded in the cartridge auto-changer from the first position 3*a*.

FIG. 8 shows all possible directions in which the information recording cartridge 3 of the second embodiment is inserted. Since the position of the memory module 66 is inappropriate when the information recording cartridge 3 is inserted in the directions 80a, 80b, 80d, 80e, 80f and 80g, the management information reading part 64 cannot read out management information from the memory module 66 and the determining part 69 determines that the information recording cartridge 3 has been inserted incorrectly (or has not been inserted). Further, since the position of the memory module 66 is inappropriate when information-recording cartridge 3 is inserted in the directions 80a, 80d, 80e and 80h, the management information reading part 64 cannot read out management information from the memory module 66 and the determining part 69 determines that the information recording cartridge 3 has been inserted incorrectly (or has not been inserted). Therefore, only when the user inserts the information recording cartridge 3 in the correct direction 80c, the management information reading part 64 can read out management information from the memory module 66 and the determining part 69 determines that the information recording cartridge 3 has not been inserted incorrectly.

FIG. 7 is a view showing the configuration of a front panel 7 of the tape library device in a second embodiment. The front panel 7 has a cartridge inserting port 78 and a display part 79.

In the case where the determining part 69 determines that the information recording cartridge 3 has been inserted into the cartridge storage part 8 in the incorrect direction at the first position 3a, a lid of the cartridge inserting port 78 is kept opened. The display part 79 displays that the direction of inserting the information recording cartridge 3 is incorrect.

In the second embodiment, the device to prevent cartridge incorrect insertion is disposed at the first position 3a and the second position 3b. Alternatively, the device to prevent cartridge incorrect insertion may be disposed within each cartridge storage part 8.

Although the cartridge control device 2 has the prior art device to prevent cartridge incorrect insertion, the device to prevent cartridge incorrect insertion of the second embodiment may be comprised as the second device to prevent cartridge incorrect insertion. In this case, in the cartridge control device, a second reading part is provided at the position where management information can be read out from the memory module 66 disposed on the left side in the backside of the information recording cartridge 3 and a second determining part determines whether or not the information recording cartridge 3 has been inserted from the correct direction into the cartridge control part 2. The above-mentioned device to prevent cartridge incorrect insertion is not restricted by the direction of inserting the information recording cartridge and can be also applied to the information recording cartridge inserted in any of the vertical and horizontal directions as a normal direction.

The device to prevent cartridge incorrect insertion according to the present invention can apply to any device comprising a mechanism into which any information recording cartridge is inserted from its backside, the information recording cartridge having a housing of substantially rectangular flat shape with a predetermined thickness that has a notch for preventing incorrect insertion at a corner on the right or left side in the foreside, a recording medium stored in the housing, a memory module that records management information therein, and an antenna for radio communication of the memory module disposed at a predetermined position with a displacement in the right or left direction in the rearward of the housing. The information recording cartridge is not limited to a substantially square shape and may be a rectangular shape, right and left sides of which are different in length. The present invention can apply to the cartridge auto-changer and the cartridge automatic control device with an auto-changer with respect to the above-mentioned any information recording cartridge.

The device to prevent cartridge incorrect insertion may have both configurations in the first embodiment and the second embodiment.

Although the information recording cartridge of the first embodiment and the second embodiment is a magnetic recording medium, it is not limited to the magnetic recording medium and may be any recording medium such as an optical or magnetic optical recording medium.

The device to prevent cartridge incorrect insertion, the cartridge auto-changer and the cartridge automatic control device with an auto-changer according to the present invention is useful as the device to prevent cartridge incorrect insertion, the cartridge auto-changer and the cartridge automatic control device with an auto-changer for a magnetic tape cartridge as well as various information recording cartridge including a cartridge storing an optical disk therein.

While preferred embodiments of the present invention have been described in detail to a certain degree, it is to be understood that, within the scope and spirit of the claims made herein, the invention may be practiced otherwise than as specifically described herein, the invention may be modified in arrangement and detail without departing from such scope and spirit.

The invention claimed is:

1. A device for preventing an incorrect insertion of a cartridge into a cartridge storage space said device comprising:
    a claw operable to protrude into a recessed part of the cartridge only when the cartridge is inserted into the cartridge storage space in a correct orientation, the cartridge including a housing that has the recessed part opened to one side of the cartridge and disposed at a position other than a central position of the cartridge, and a magnetic tape reel, the recessed part being used for inserting a reel base that engages with the magnetic tape reel; and
    a stopper operable to work with said claw such that when said claw protrudes into the recessed part of the cartridge, said stopper is disposed to allow the cartridge to be inserted and stored in the cartridge storage space, and when said claw does not protrude into the recessed part of the cartridge, said stopper is disposed to prevent the cartridge from being inserted and stored in the cartridge storage space.

2. A device as claimed in claim 1, the cartridge being inserted into the cartridge storage space in a correct orientation when the cartridge is inserted from a predetermined direction into the cartridge storage space.

3. A device as claimed in claim 1, further comprising a joint part operable to join said claw with said stopper, said joint part being disposed to rock on a shaft as a fulcrum.

4. A device as claimed in claim 1, further comprising a plurality of at least one of said claw and said stopper.

5. A device for preventing an incorrect insertion of a cartridge into a cartridge storage space, the cartridge including a housing having a recessed part opened to one side of the cartridge and disposed at a position other than a central position of the cartridge, and a magnetic tape reel, the recessed part being used for inserting a reel base that engages with the magnetic tape reel, said device comprising:

a claw operable to protrude into the recessed part of the cartridge only when the cartridge is inserted into the cartridge storage space in a correct orientation;

a claw position detecting part, having a switch the state of which is switched based on a position of said claw, operable to detect whether or not said claw protrudes into the recessed part of the cartridge based on the state of said switch, and output a detection result indicating whether or not said claw protrudes into the recessed part; and a determining part operable to determine that the insertion of the cartridge is in a correct orientation when the inputted detection result from said claw position detecting part indicates that said claw protrudes into the recessed part, and to determine that the insertion of the cartridge is in an incorrect orientation when the inputted detection result from said claw position detecting part indicates that said claw does not protrude into the recessed part; and said determining part operable to activate at least one of a suspension operation to suspend the insertion; an operation to provide information of an incorrect insertion; and an ejection operation to eject the cartridge from the cartridge storage space, when said determining part determines that the insertion of the cartridge is not in a correct orientation.

6. A device as claimed in claim 5, the cartridge being inserted into the cartridge storage space in a correct orientation when the cartridge is inserted from a predetermined direction into the cartridge storage space.

7. A cartridge changer for performing cartridge changing and preventing an incorrect insertion of a cartridge into a cartridge storage space said cartridge changer comprising:

a plurality of cartridge storage parts each of which includes the cartridge storage space for mounting the cartridge;

a moving mechanism operable to move a selected one of said plurality of cartridge storage parts from a first position, at which the cartridge is inserted into the cartridge storage space, to a second position which is different than the first position; and a device disposed in at least one of the first position, the second position, and the plurality of cartridge storage parts, said device comprising:

a claw operable to protrude into a recessed part of the cartridge only when the cartridge is inserted into the cartridge storage space in a correct orientation, the cartridge including a housing that has the recessed part opened to one side of the cartridge and disposed at a position other than a central position of the cartridge, and a magnetic tape reel, the recessed part being used for inserting a reel base that engages with the magnetic tape reel; and a stopper operable to work with said claw such that when said claw protrudes into the recessed part of the cartridge, said stopper is disposed to allow the cartridge to be inserted and stored in the cartridge storage space, and when said claw does not protrude into the recessed part of the cartridge, said stopper is disposed to prevent the cartridge from being inserted and stored in the cartridge storage space.

8. A cartridge changer as claimed in claim 7, the cartridge being inserted into the cartridge storage space in a correct orientation when the cartridge is inserted from its backside into the cartridge storage space.

9. A cartridge changer as claimed in claim 7, the second position being adjacent to a cartridge inserting point of a cartridge control device used for recording information to and/or reproducing information from magnetic tape contained on the magnetic tape reel.

10. A cartridge changer as claimed in claim 7, further comprising a cartridge control device disposed in a position adjacent to the second position, said cartridge control device comprising:

a second cartridge storage part for mounting the cartridge; and a control part operable to record information to and/or reproduce information from magnetic tape contained on the magnetic tape reel.

11. A cartridge changer as claimed in claim 10, said cartridge control device further comprising a second device operable to prevent an incorrect insertion of the cartridge into said second cartridge storage part.

12. A cartridge changer as claimed in claim 11, said second device being operable to detect that the cartridge has been inserted into said second cartridge storage part in an incorrect orientation.

13. A cartridge changer as claimed in claim 12, the cartridge being inserted into said second cartridge storage part in a correct orientation when the cartridge is inserted from its foreside into said second cartridge storage part.

14. A cartridge changer as claimed in claim 11, said second device containing a projection for preventing the incorrect insertion of the cartridge into said second cartridge storage part, wherein a notch provided on a corner of the cartridge must be aligned with said projection for correct insertion.

15. A device for preventing an incorrect insertion of a cartridge into a cartridge storage space, said device comprising:

a claw operable to protrude into a recessed part of the cartridge only when the cartridge is inserted into the cartridge storage space in a correct orientation, the cartridge including a housing that has the recessed part opened to one side of the cartridge and disposed at a position other than a central position of the cartridge, and a magnetic tape reel, the recessed part being used for inserting a reel base that engages with the magnetic tape reel;

a stopper operable to work with said claw such that when said claw protrudes into the recessed part of the cartridge, said stopper is disposed to allow the cartridge to be inserted and stored in the cartridge storage space, and when said claw does not protrude into the recessed part of the cartridge, said stopper is disposed to prevent the cartridge from being inserted and stored in the cartridge storage space; and a determining part operable to determine that the insertion of the cartridge is in a correct orientation when said claw protrudes into the recessed part, and to determine that insertion of the cartridge is in an incorrect orientation when said claw does not protrude into the recessed part.

* * * * *